United States Patent
Sahlin et al.

(10) Patent No.: US 11,191,102 B2
(45) Date of Patent: Nov. 30, 2021

(54) RANDOM-ACCESS PROCEDURE

(71) Applicant: Telefonaktiebolaget LM Ericsson (publ), Stockholm (SE)

(72) Inventors: Henrik Sahlin, Mölnlycke (SE); Robert Baldemair, Solna (SE); Erik Dahlman, Stockholm (SE); Stefan Parkvall, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/579,494

(22) PCT Filed: Nov. 8, 2017

(86) PCT No.: PCT/EP2017/078563
§ 371 (c)(1),
(2) Date: Dec. 4, 2017

(87) PCT Pub. No.: WO2018/087124
PCT Pub. Date: May 17, 2018

(65) Prior Publication Data
US 2019/0141741 A1 May 9, 2019

Related U.S. Application Data

(60) Provisional application No. 62/421,005, filed on Nov. 11, 2016.

(51) Int. Cl.
| | |
|---|---|
| H04W 74/00 | (2009.01) |
| H04L 27/00 | (2006.01) |
| H04L 1/00 | (2006.01) |
| H04L 5/00 | (2006.01) |
| H04W 72/08 | (2009.01) |
| H04W 72/14 | (2009.01) |

(52) U.S. Cl.
CPC ......... *H04W 74/006* (2013.01); *H04L 1/0003* (2013.01); *H04L 1/0005* (2013.01);
(Continued)

(58) Field of Classification Search
CPC . H04W 74/006; H04W 72/082; H04W 72/14; H04L 27/0012; H04L 1/0003;
(Continued)

(56) References Cited

U.S. PATENT DOCUMENTS

| | | |
|---|---|---|
| 2009/0041240 A1 | 2/2009 | Parkvall et al. |
| 2010/0034152 A1 | 2/2010 | Imamura |

(Continued)

FOREIGN PATENT DOCUMENTS

| | | |
|---|---|---|
| CN | 103098526 A | 5/2013 |
| CN | 103718636 A | 4/2014 |

(Continued)

OTHER PUBLICATIONS

PCT Notification of Transmittal of the International Search Report and the Written Opinion of the International Searching Authority, or the Declaration for International application No. PCT/EP2017/078563—dated Feb. 27, 2018.

(Continued)

*Primary Examiner* — Brenda H Pham
(74) *Attorney, Agent, or Firm* — Baker Botts, LLP

(57) ABSTRACT

A method in a network node for managing random-access procedures with a plurality of wireless devices. The method comprising transmitting an indication of a modulation format to one or more of the plurality of wireless devices to configure the modulation format for a random access message 3 transmission from the one or more wireless devices.

15 Claims, 16 Drawing Sheets

(52) U.S. Cl.
CPC .......... *H04L 5/0007* (2013.01); *H04L 5/0041* (2013.01); *H04L 5/0053* (2013.01); *H04L 5/0091* (2013.01); *H04L 27/0012* (2013.01); *H04W 72/082* (2013.01); *H04W 72/14* (2013.01); *H04W 74/004* (2013.01)

(58) Field of Classification Search
CPC ... H04L 5/0091; H04L 5/0041; H04L 5/0007; H04L 1/0005; H04L 5/0053
See application file for complete search history.

(56) References Cited

U.S. PATENT DOCUMENTS

| | | | |
|---|---|---|---|
| 2011/0134868 | A1 | 6/2011 | Lee et al. |
| 2012/0063302 | A1 | 3/2012 | Damnjanovic et al. |
| 2015/0071212 | A1 | 3/2015 | Kim et al. |
| 2015/0245387 | A1 | 8/2015 | Park et al. |
| 2015/0373740 | A1 | 12/2015 | Eriksson et al. |
| 2016/0255654 | A1 | 9/2016 | Lin et al. |
| 2016/0295609 | A1 | 10/2016 | Vajapeyam et al. |
| 2016/0366705 | A1* | 12/2016 | Mujtaba ............ H04W 74/0833 |
| 2018/0116000 | A1* | 4/2018 | Ly .................... H04W 74/0833 |
| 2018/0139785 | A1* | 5/2018 | Zhang ................. H04L 5/0048 |
| 2018/0279361 | A1* | 9/2018 | Yoo .................. H04W 74/0833 |
| 2019/0104516 | A1* | 4/2019 | Oh .................... H04W 72/0413 |

FOREIGN PATENT DOCUMENTS

| | | |
|---|---|---|
| CN | 104919885 A | 9/2015 |
| NC | 2017/0010353 | 10/2017 |
| NC | 2018/0003463 | 4/2018 |
| RU | 2011 132 398 A1 | 12/2009 |
| WO | 2008057969 A2 | 5/2008 |
| WO | WO 2018081385 | 5/2018 |

OTHER PUBLICATIONS

3GPP TSG-RAN WG2 #92; Anaheim, USA; Source: Ericsson; Title: Remaining issues on random access for Rel-13 complexity and enhanced coverage UEs (R2-156774)—Nov. 16-20, 2015.

3GPP TS 36.211 v11.6.0; Technical Specification; 3rd Generation Partnership Project; Technical Specification Group Radio Access Network; Evolved Universal Terrestrial Radio Access (E-UTRA); Physical channels and modulation (Release 11)—Sep. 2014.

3GPP TS 36.212 v11.7.0; Technical Specification; 3rd Generation Partnership Project; Technical Specification Group Radio Access Network; Evolved Universal Terrestrial Radio Access (E-UTRA); Multiplexing and channel coding (Release 11)—Mar. 2016.

3GPP TS 36.213 v11.12.0; Technical Specification; 3rd Generation Partnership Project; Technical Specification Group Radio Access Network; Evolved Universal Terrestrial Radio Access (E-UTRA); Physical layer procedures (Release 11)—Sep. 2016.

Innovation, Science and Economic Development Canada, Canadian Intellectual Property Office, Office Action, Application No. 3,043,484, dated Nov. 4, 2019.

EPO Communication, Application No. 17 804 469.9-1220; Ref. P51739 EP1; dated Oct. 1, 2019.

Russian Official Action issued for Application No. 2019117947/08—dated Jan. 17, 2020.

Notice of Reasons for Rejection issued by the Japan Patent Office for Patent Application No. 2019-524392—dated Jun. 22, 2020.

3GPP TSG RAN WG1 Meeting #84-bis; Busan, Korea; Source: Ericsson; Title: NB-IoT-Remaining issues for NPRACH (R1-162779)—dated Apr. 11-15, 2016.

3GPP TSG-RAN WG1 #88; Lisbon, Portugal; Source: Qualcomm Incorporated; Title: User Multiplexing of DFTs-OFDM and OFDM in uplink (R1-1610114)—Oct. 10-14, 2016.

Office Action issued by the National Institute of Industrial Property, National Patent Administration of Argentina for Application No. 20170103145—dated Sep. 26, 2020.

First Office Action issued by the Republic of Colombia for File Ref. No. NC2019/0004764—dated Jan. 27, 2021.

Study on Information Transmission in Synchronous Random Access by Yan Ying and Yang Long-Lin; Communications Technology, vol. 40, No. 12, No. 192, Totally—2007.

3GPP TSG-RAN WG2 NB-IoT AH; Budapest, Hungary; Source: ZTE; Title: Random access procedure and messages for NB-IoT (R2-160412)—Jan. 19-21, 2016.

Chinese Office Action issued for Application No. 201780083206.7—dated Jun. 4, 2021.

* cited by examiner

RANDOM-ACCESS PROCEDURE

PRIORITY

This nonprovisional application is a U.S. National Stage Filing under 35 U.S.C. § 371 of International Patent Application Serial No. PCT/EP2017/078563 filed Nov. 8, 2017, and entitled "Random-Access Procedure" which claims priority to U.S. Provisional Patent Application No. 62/421,005 filed Nov. 11, 2016, both of which are hereby incorporated by reference in their entirety.

TECHNICAL FIELD

The present disclosure relates, in general, to wireless communications and, more particularly, to a random-access response procedure.

BACKGROUND

A random-access procedure is a key function in a cellular system. FIG. 1 illustrates the random-access procedure in LTE. A similar structure is expected to be used in 5G New Radio (NR). In 4G LTE, a UE that would like to access the network initiates the random-access procedure by transmitting a preamble (Msg1), 30, in the uplink on the Physical Random-Access Channel (PRACH). A base station receiving the preamble and detecting the random-access attempt will respond in the downlink by transmitting a random-access response (Msg2), 40, on the Physical Downlink Shared Channel (PDSCH). The random-access response carries an uplink scheduling grant for the UE to continue the procedure by transmitting a subsequent message in the uplink (Msg3), 50, on the Physical Uplink Shared Channel (PUSCH) for terminal identification.

The 4G wireless access within LTE is based on OFDM in downlink and DFT-spread OFDM (DFTS-OFDM, SC-FDMA) in uplink [see 3GPP TS 36.211]. An illustration of DFT-spread OFDM is shown in FIG. 2, where the information bits are used to calculate an error detection code (CRC, Cyclic Redundancy Check), channel coded, rate matched and modulated to complex valued symbols such as QPSK, 16 QAM or 64 QAM. Symbols corresponding to several control entities and symbols corresponding to payload are then multiplexed, pre-coded by a DFT (transform precoding), mapped to a frequency interval in which it is allocated, transformed to the time domain, concatenated with a cyclic prefix and finally transmitted over air. The order of some of the processing blocks might be changed. For example, the modulation might be placed after the multiplexing instead of before.

The symbol constructed by the DFT, mapping, IFFT and CP insertion is denoted as a SC-FDMA symbol in [3GPP TS 36.211, section 5.6]. Within LTE release 8, a TTI is constructed by 14 such SC-FDMA symbols.

This DFT-spread OFDM as used in uplink has significantly lower Peak to Average Power Ratio (PAPR) as compared to OFDM. By having a low PAPR, the transmitter can be equipped with simpler and less energy consuming radio equipment, which is important for user devices where cost and battery consumptions are important issues. Also, the UE can use higher transmit power for DFTS-OFDM as compared to OFDM. In future 5G systems, this single carrier property with low PAPR might be important not only for power limited UEs in uplink but also for downlink and device to device transmissions.

In LTE, the message 3 is based on DFTS-OFDM. An illustration is given in FIG. 3 of one sub-frame with 14 DFTS-OFDM symbols, where two DFTS-OFDM symbols are used for demodulation reference signals.

An illustration of ordinary OFDM is given in FIG. 4. Here, the DFT before the mapping is removed, as compared to DFTS-OFDM in FIG. 2. An illustration is given in FIG. 5 of several sub-frames, each with 14 OFDM symbols, including reference signals.

Within 5G NR, the air interfaces between uplink and downlink should be aligned. One suggestion may be to use OFDM in both downlink and uplink. Another reason for using OFDM in the uplink is multi-layer transmission (MIMO) where multiple layers are spatially multiplexed from a single UE. With OFDM, the base station receiver may become simpler. The use of OFDM also allows for more flexibility in terms of multiplexing different signals as not only the time domain can be used but also the frequency domain. Hence, for NR it has been agreed to support both OFDM and DFTS-OFDM.

With message 3 modulation format based on OFDM, some UEs will experience coverage issues when using lower transmit power with OFDM as compared to using DFTS-OFDM. Also, an OFDM transmission might have to use lower transmit power as compared to the PRACH preamble, if the PRACH preamble is constructed to have low PAPR. This is because a larger backoff must be used in the power amplifier for an OFDM transmission as compared to transmitting with DFTS-OFDM.

If message 3 modulation format is always based on DFTS-OFDM, then all base stations need both an OFDM and an DFTS-OFDM receiver. Furthermore, a somewhat higher resource overhead might be needed for DFTS-OFDM as compared to OFDM.

SUMMARY

In an embodiment a method in a network node for managing random-access procedures with a plurality of wireless devices is disclosed. The method comprises transmitting an indication of a modulation format to one or more of the plurality of wireless devices to configure the modulation format for a random access message 3 transmission from the one or more wireless devices. This provides the advantage that the modulation format can be selected depending on certain network conditions and therefore a more optimum modulation format may be applied.

In one example the indicated modulation format is either Discrete Fourier Transform Spread-Orthogonal Frequency Division Multiplexing, DFTS-OFDM, or OFDM.

In another example the the random access message 3 is the third message in a random access sequence, wherein a first random access message comprises a random access preamble and a second random access message comprises a random access response, RAR.

In some examples the indicated modulation format applies to future data transmissions from the wireless device.

In one aspect transmitting the indication of a modulation format comprises an indication within a broadcast channel. In some examples transmitting the indication of a modulation format comprises an indication within System Information.

In another aspect transmitting the indication of a modulation format comprises an indication within a Random Access Response, RAR, message.

In some examples the indication is an implicit indication of a modulation format.

In another aspect the method further comprises selecting the modulation format, wherein the selection is based on one or more of: a capability of the network node, a link budget for the wireless device, an overhead of transmissions to be transmitted by the wireless device, a determined power level and/or signal to noise ratio, SNR, of the wireless device and a random access preamble detection criterion.

In another aspect the method further comprises receiving a transmission from the wireless device according to the indicated modulation format. In some examples the received transmission is in response to an uplink scheduling grant included in the random access response message.

In another aspect the indication of a modulation format further comprises an indication of a plurality of modulation formats and receiving an indication from the wireless device of a selected one of the plurality of modulation formats. In some examples the plurality of modulation formats comprises Discrete Fourier Transform Spread-Orthogonal Frequency Division Multiplexing, DFTS-OFDM, and OFDM.

In another embodiment a method in a wireless device for performing a random-access procedure with a network node is provided. The method comprises receiving, from a network node, an indication of a modulation format for a random access message 3 transmission to the network node. The method further comprises transmitting the random access message 3 according to the indicated modulation format.

In one aspect the indication of a modulation format comprises an indication of a plurality of modulation formats and the method further comprises selecting one of the plurality of modulation formats; and transmitting an indication of the selected modulation format to the network node.

In another embodiment a network node operable to manage a random-access procedure with a wireless device is provided The network node is configured to transmit an indication of a modulation format to the wireless device to configure the modulation format to be used for a random access message 3 transmission from the wireless device.

In one aspect the network node is further configured to select the modulation format, wherein the selection is based on one or more of: a capability of the network node, a link budget for the wireless device, an overhead of transmissions to be transmitted by the wireless device, a determined power level and/or signal to noise ratio, SNR, of the wireless device and a random access preamble detection criterion.

In another aspect the indication of a modulation format comprises an indication of a plurality of modulation formats, and the network node is further configured to receive an indication from the wireless device of a selected one of the plurality of modulation formats.

In one example the network node is further configured to receive a transmission from the wireless device according to the selected modulation format.

In some examples the received transmission is in response to an uplink scheduling grant included in the random access response message.

In further embodiment a wireless device operable to perform a random-access procedure with a network node is disclosed. The wireless device is configured to receive an indication of a modulation format for a random access message 3 transmission to the network node and transmit the random access message 3 according to the indicated modulation format.

In some examples the modulation format is either Discrete Fourier Transform Spread-Orthogonal Frequency Division Multiplexing, DFTS-OFDM, or OFDM. In some examples the random access message 3 is the third message in a random access sequence, wherein a first random access message comprises a random access preamble and a second random access message comprises a random access response, RAR. In some examples the indication of the modulation format applies to future data transmissions from the wireless device.

In one aspect the indication of the modulation format comprises an indication within a broadcast channel. In some examples the indication of the modulation format comprises an indication within System Information, SI.

In another aspect the indication of the modulation format comprises an indication within a Random Access Response, RAR, message.

In some examples the indication is an implicit indication of a modulation format.

In another aspect the indication of a modulation format comprises an indication of a plurality of modulation formats and the wireless device is further configured to select a modulation format and transmit an indication of the selected modulation format to the network node. In some examples the plurality of modulation formats comprises Discrete Fourier Transform Spread-Orthogonal Frequency Division Multiplexing, DFTS-OFDM, and OFDM.

In another embodiment a network node comprising a transceiver, a processor and a memory is disclosed, wherein the network node is operable to manage a random-access procedure with a wireless device, wherein the processor is configured to transmit, via the transceiver, an indication of a modulation formal to the wireless device to configure the modulation format to be used for a random access message 3 transmission from the wireless device.

In another embodiment a wireless device comprising a transceiver, a processor and a memory is disclosed, wherein the wireless device is operable to perform a random-access procedure with a network node, wherein the processor is configured to receive, via the transceiver an indication of a modulation format for a random access message 3 transmission to the network node; and transmit, via the transceiver, a random access message 3 according to the indicated modulation format.

In a further embodiment a computer program, computer program product or carrier, containing instructions is disclosed, wherein the instructions when executed on a computer perform any one of the methods described herein.

DETAILED DESCRIPTION

In some embodiments, a message is introduced in the random-access response (RAR) or with a broadcast channel which configures the UE to transmit message 3 with OFDM or DFTS-OFDM. As an advantage, the selection between the modulation formats for message 3 can be based on the capabilities of receivers in the base station, the link budget for an individual UE, and/or the affordable overhead of the message 3.

Figure 6:
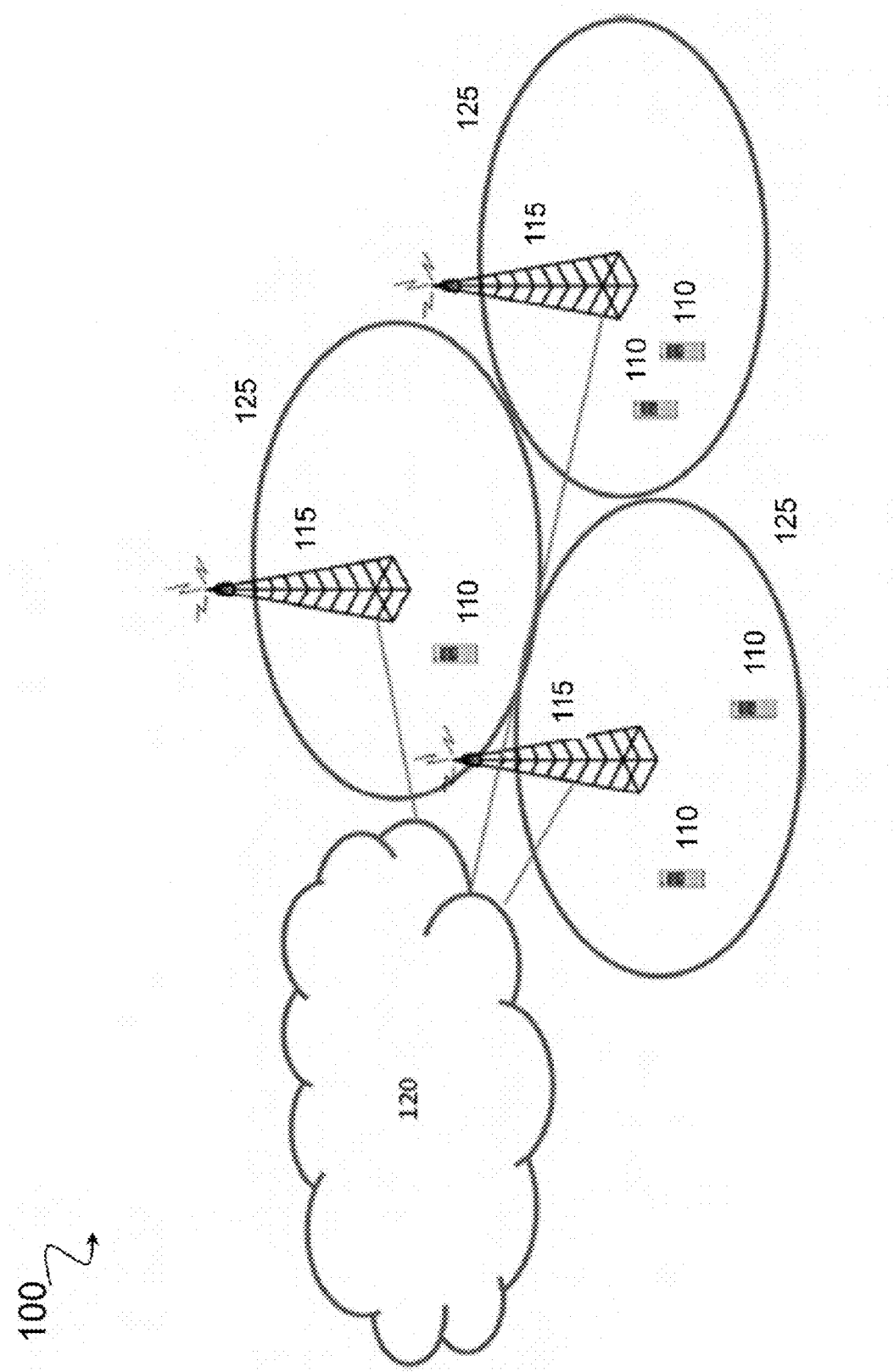
FIG. 6 illustrates an example environment of embodiments of the present disclosure.

FIG. 6 is a block diagram illustrating an embodiment of a network 100, in accordance with certain embodiments. Network 100 includes one or more User Equipment, UE(s), 110 (which may be interchangeably referred to as wireless devices 110) and one or more network node(s) 115 (which may be interchangeably referred to as eNBs or gNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE. In certain embodiments, network nodes 115 may transmit one or more beams, and one or more UE 110 may be asked to monitor these beams from one or more of network nodes 115.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UL 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station (RBS), Node B, multi-standard radio (MSR) radio node such as MSR BS, evolved Node B (eNB), gNB network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and wireless device or UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 8-14.

Although FIG. 6 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UR and another communication device (such as a landline telephone). Furthermore, although certain embodiments may be described as implemented in 5G network, the embodiments may be implemented in any appropriate type of telecommunication system supporting any suitable communication standards and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, NR, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

In some embodiments, an additional bit field is included in RAR if the RAR indicates the use of OFDM versus DFTS-OFDM. This field may be called the "modulation format." This RAR can be UE specific, PRACH preamble specific or common for a group of UEs. In the latter case, several UEs can be specified with one single modulation format field. The modulation format could also be implicitly signaled, e.g. tied to a certain resource allocation in the uplink grant, tied to the DL resources used to transmit the RAR, derived from the TC-RNTI, or depend on the back-off indicator.

In some embodiments, the "modulation format" may be indicated in a broadcast channel and transmitted in a non UE-specific manner. A variant of this may be to tie the uplink waveform to some quantity used during the downlink cell search and synchronization such as the synchronization sequence (one set of sync sequences or cell IDs means DFTS-OFDM, another set means OFDM). The broadcast channel could be the master information block (MIB) or a system information block (SIB) which is read by the UE prior to performing a random-access. In other words, the broadcast channel may include a master information block (MIB) or a system information block (SIB).

In some embodiments, the selection of modulation format can be based upon PRACH preamble detection. If the PRACH preamble is detected with low power or with a low SNR, then this may indicate that the UE is power limited and the use of DFTS-OFDM is better than OFDM when transmitting message 3.

As stated above, some embodiments introduce a message in the random-access response (RAR) and other embodiments use a broadcast channel which configures the UE to transmit message 3 with OFDM or DFTS-OFDM.

The Random Access Response typically has the following payload:
  Detected PRACH preamble index such as to acknowledge of PRACH preamble
  Timing Advance (TA) command to UE
  Uplink scheduling grant to UE
  Temporary identity (e.g. TC-RNTI)
  Configuration of additional synchronization signals if needed
  Back off Indicator (BI)

Figure 7:
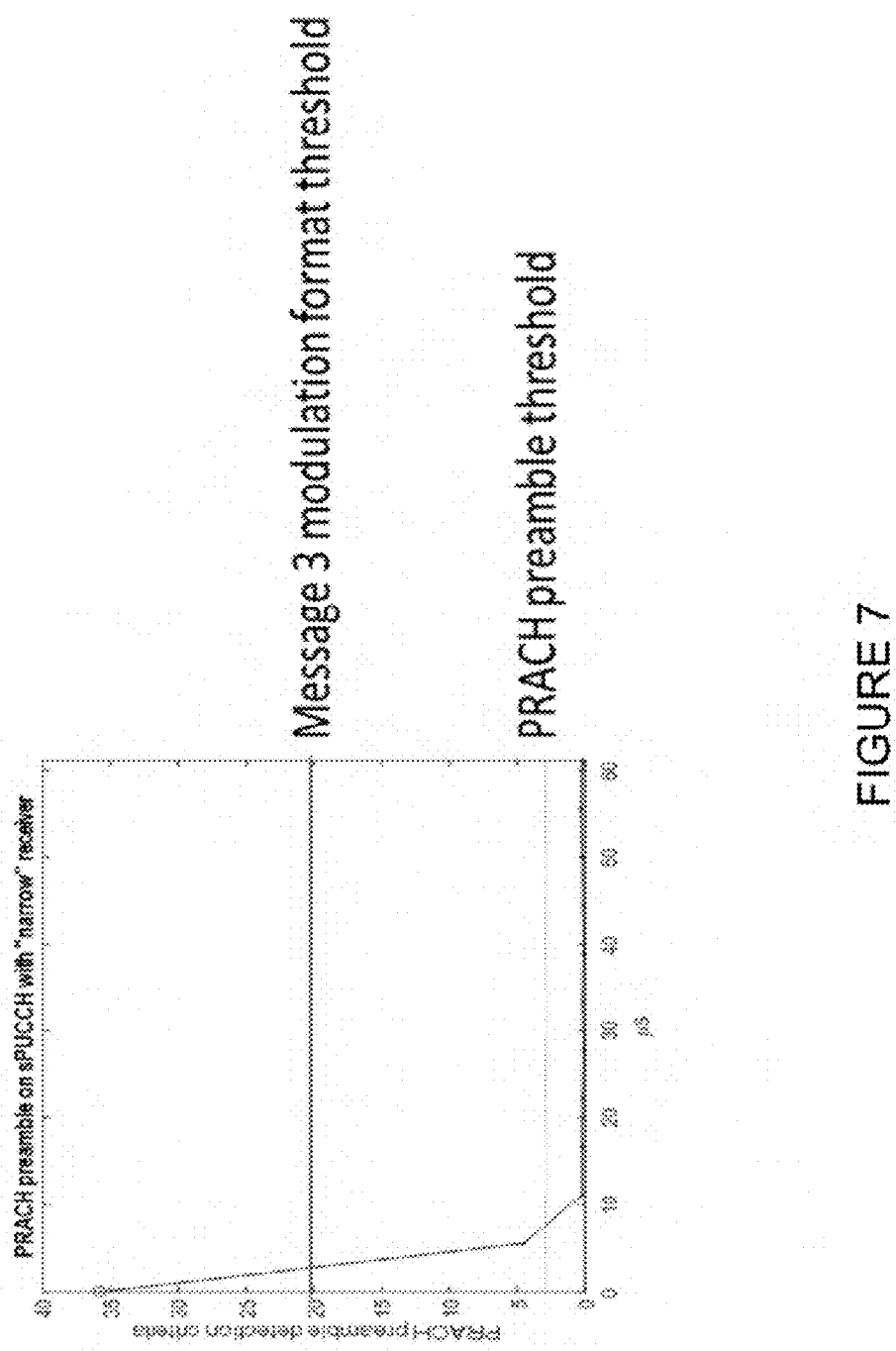
FIG. 7 illustrates an example scenario of an embodiment of the present disclosure.

FIG. 7 illustrates a PRACH preamble detection criteria. This criterion corresponds to received signal strength for a PRACH preamble. A preamble detection threshold is also included which is used such that a preamble is considered as detected if the PRACH preamble criteria exceeds this threshold. A second threshold is also included, for which the base stations order the UE to use OFDM for message 3 if the PRACH preamble criteria is above this threshold and DFTS-OFDM otherwise. In these embodiments, the modulation format field could be included in the RAR tied to the detected PRACH preamble.

In some embodiments, the "modulation format" may be used to configure more aspects of the message 3 transmissions such as number of OFDM (or DFTS-OFDM) symbols, reference signal density in time and frequency, number of layers, etc. This to adjust the message 3 format depending on link budget, measured e.g. from received PRACH preamble. In this way, the resource allocation needed for message 3 can be lower when a UE has a good link budget.

In some embodiments, the selection between DFTS-OFDM or OFDM in the RAR is used to determine the uplink waveform also for future data transmission, i.e. to make the RAR waveform selection "persistent." This may avoid to have to inform the UE during subsequent data transmission whether to use DFTS-OFDM or OFDM.

If the message 3 modulation format is indicated in system information (SI) it could either specify just DFTS-OFDM or OFDM in which case the LIE would have to obey the configuration. System information (SI) may comprise a master information block (MIB) or a system information block (SIB). However, the gNB could also indicate both OFDM and DFTS-OFDM. In this case one possibility would be the UE selects—based on e.g. its power budget—one preamble transmission scheme and the gNB blindly detects the transmission scheme. The blind decoding could be based on the reference signal of message 3.

Another possibility is that gNB specifies two sets of PRACH preambles: UE selects preamble from first set if it wishes to use OFDM for message 3 and selects preamble from second set if it wishes to use DFTS-OFDM for message 3 (if a gNB specifies both preamble sets this is one possibility to signal a gNB supports both OFDM and DFTS-OFDM for message 3 while if only one set has non-zero cardinality only the corresponding transmission scheme is supported).

Based on, for example power of received PSS, SSS and PBCH, the UE selects a PRACH preamble of the first or second preamble set and by that indicates OFDM or DFTS-OFDM for message 3. This received power can be used to calculate the path loss between gNB and UE. In another example the UE selects between OFDM and DFTS-OFDM based on PRACH preamble power. This PRACH preamble power can be based on calculated path loss or PRACH power ramping. For example, in first transmission(s) UE selects preamble indicating OFDM, but if it must ramp its transmission power it switches to a preamble indicating DFTS-OFDM.

A gNB receiving a PRACH preamble and granting a matching message 3 transmission knows then which transmission scheme to expect for the message 3 transmission. Optionally this scheme could still be complemented with a modulation format bit in RAR to potentially overwrite a UE preference for message 3 transmission scheme.

The selection of PRACH preamble group (which can be seen as implicit modulation format bit conveyed from UE to gNB) can as above also configure more aspects of message 3.

As provided, in some embodiments the gNB specifies two different PRACH preamble groups, one corresponding to OFDM, the other to DFTS-OFDM message 3 transmission. Instead of the PRACH preamble, some embodiments may use different PRACH formats or resources in time/frequency corresponding to OFDM and DFTS-OFDM message 3 transmission.

Figure 1:
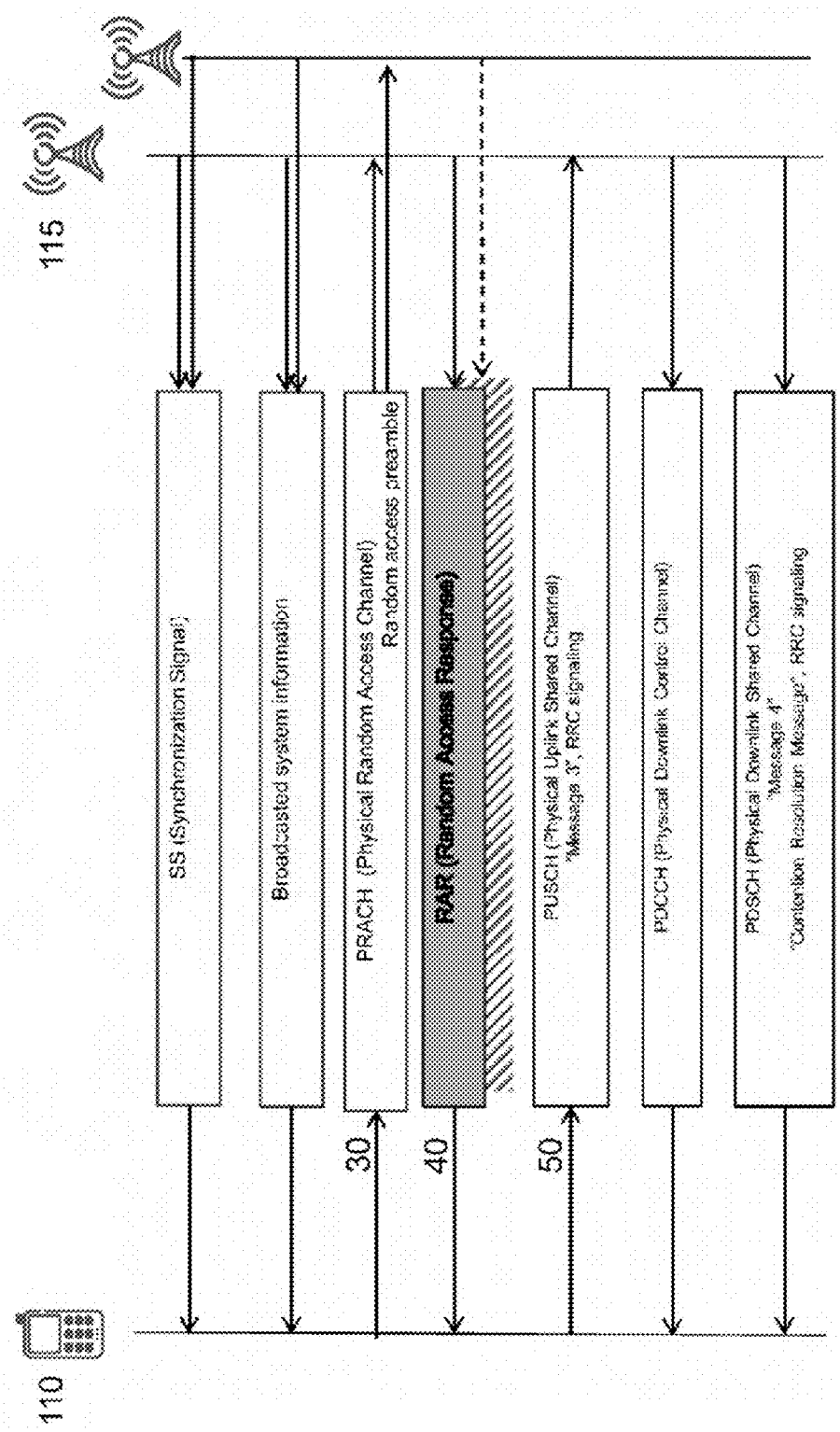
FIG. 1 illustrates a scenario in which embodiments of the present disclosure may be applied.
Figure 2:
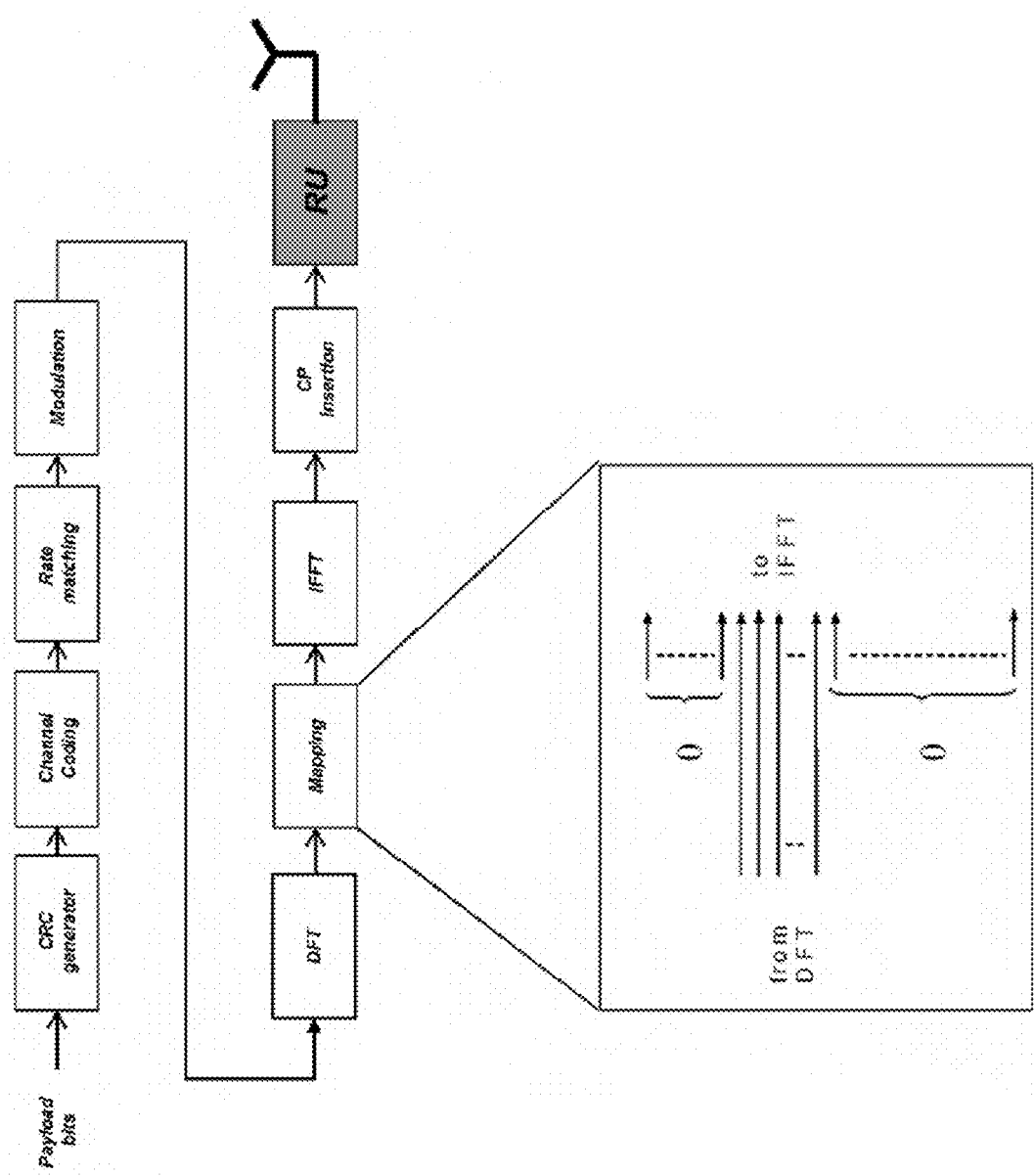
FIG. 2 illustrates an example procedure in which embodiments of the present disclosure may be applied.
Figure 3:
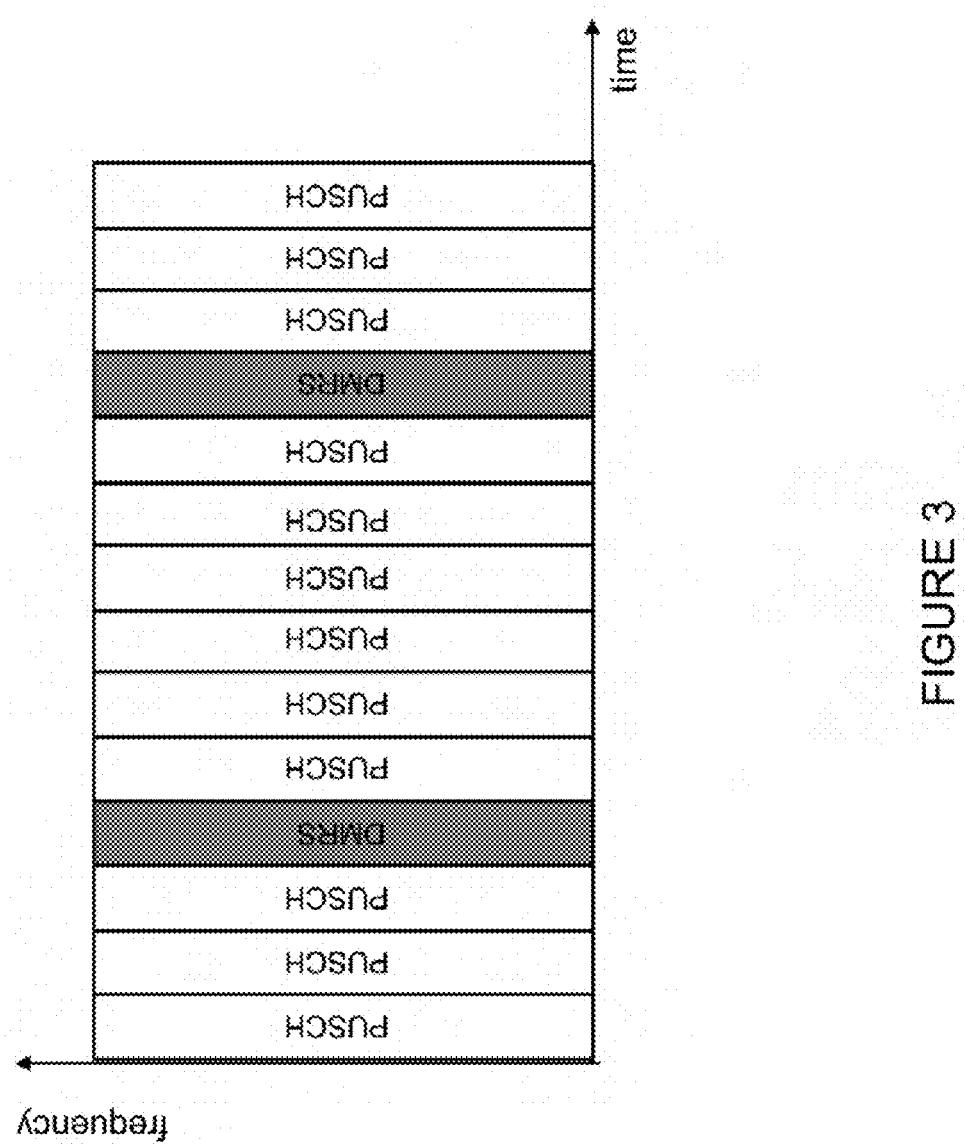
FIG. 3 illustrates an example scenario in which embodiments of the present disclosure may be applied.
Figure 4:
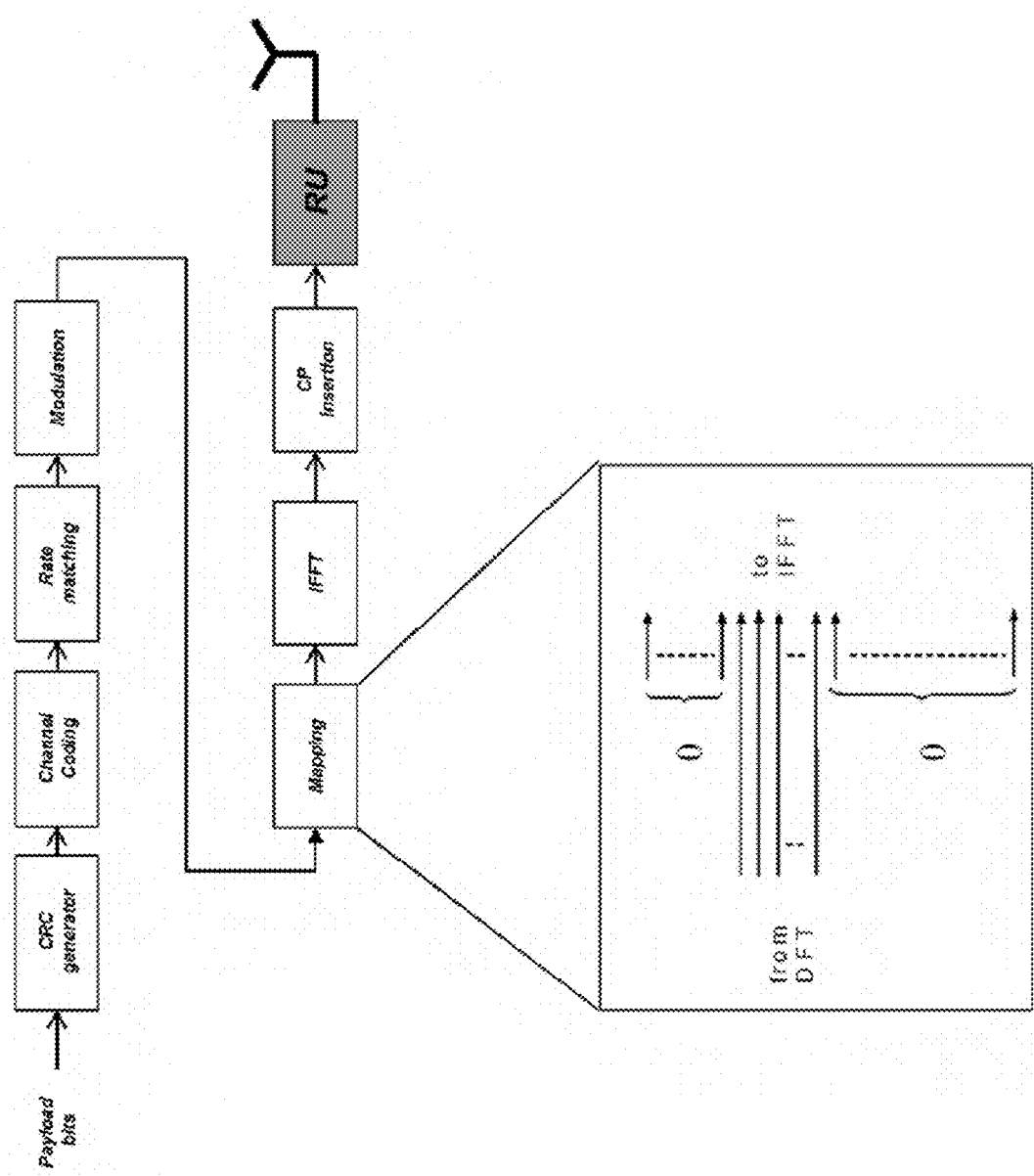
FIG. 4 illustrates further example procedure in which embodiments of the present disclosure may be applied.
Figure 5:
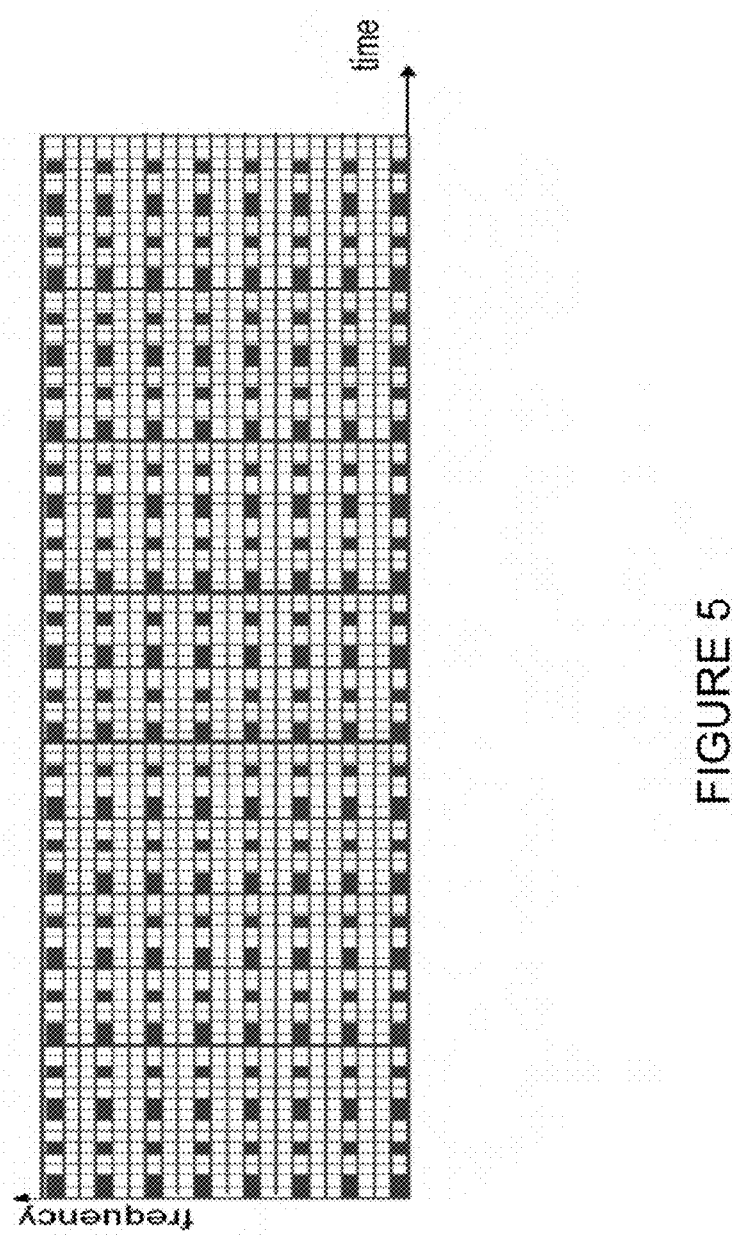
FIG. 5 illustrates a further example scenario in which embodiments of the present disclosure may be applied.
Figure 8:
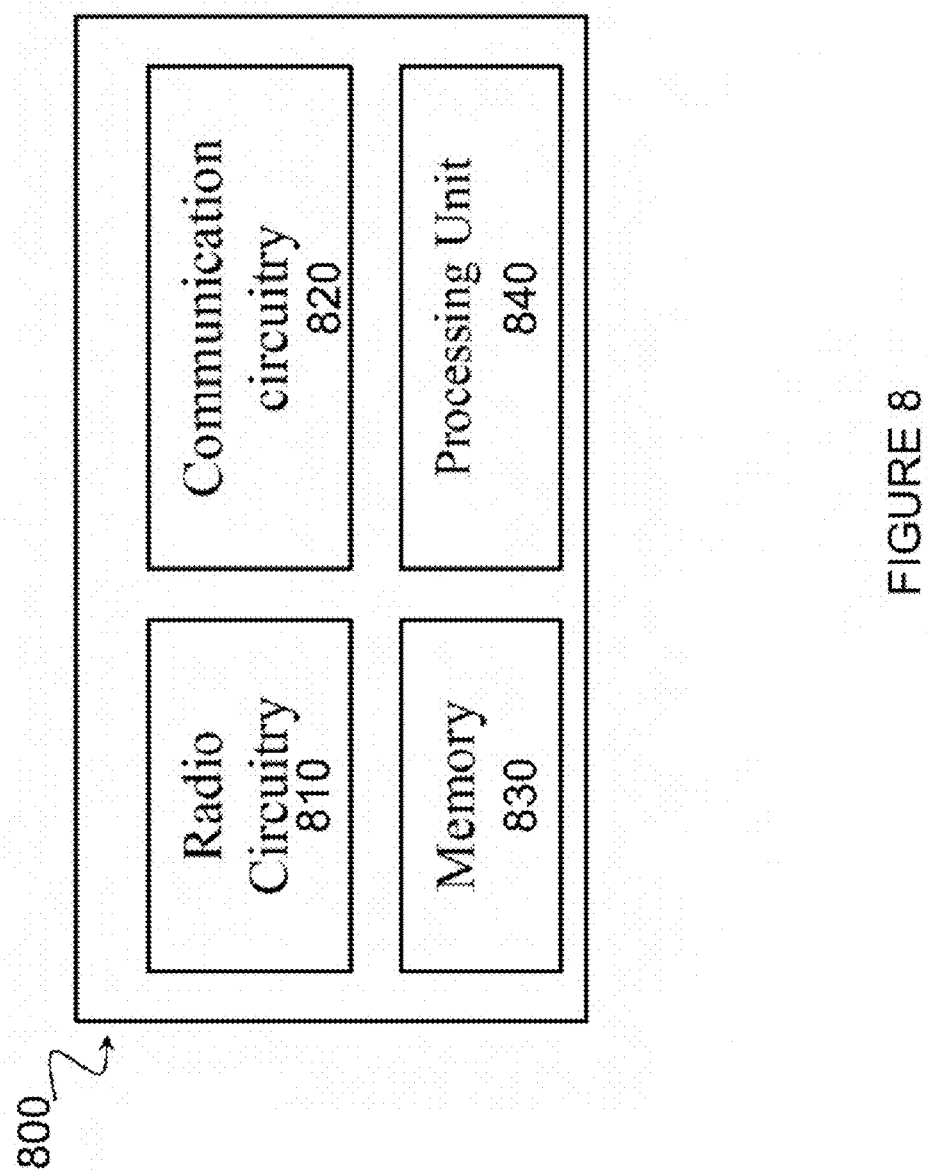
FIG. 8 is a block diagram illustrating example physical units of a network node according to one or more embodiments of the present disclosure.

FIG. 8 is a block schematic of an exemplary base station 800, in accordance with certain embodiments. The example base station of FIG. 1 may be configured to perform the functionality described above with respect to FIGS. 1-7, or any example of the disclosure. The example base station of FIG. 8 may be arranged with radio circuitry 810 to communicate with served UEs, communication circuitry 820 to communicate with other radio network and core network and OAM system nodes, memory 830 to store information related to the invention, and a processing unit 840. The processing unit 840 may be configured to formulate the RAR message to be provided to the UE. The memory 830 may be configured to store information about served UEs and modulation formats. The radio circuitry 810 may be configured to communicate with served UEs, including communicating a RAR: message to the UE to transmit message 3 with OFDM or DFTS-OFDM. In another example the radio circuitry 820 is configured to transmit the "modulation format" in a broadcast channel and transmitted in a non UE-specific manner. A variant of this may be to tie the uplink waveform to some quantity used during the downlink cell search and synchronization such as the synchronization sequence (one set of sync sequences or cell IDs means DFTS-OFDM, another set means OFDM). In some examples the broadcast channel includes the master information block (MIB) or a system information block (SIB) which is read by the UE prior to performing a random-access.

Figure 9:
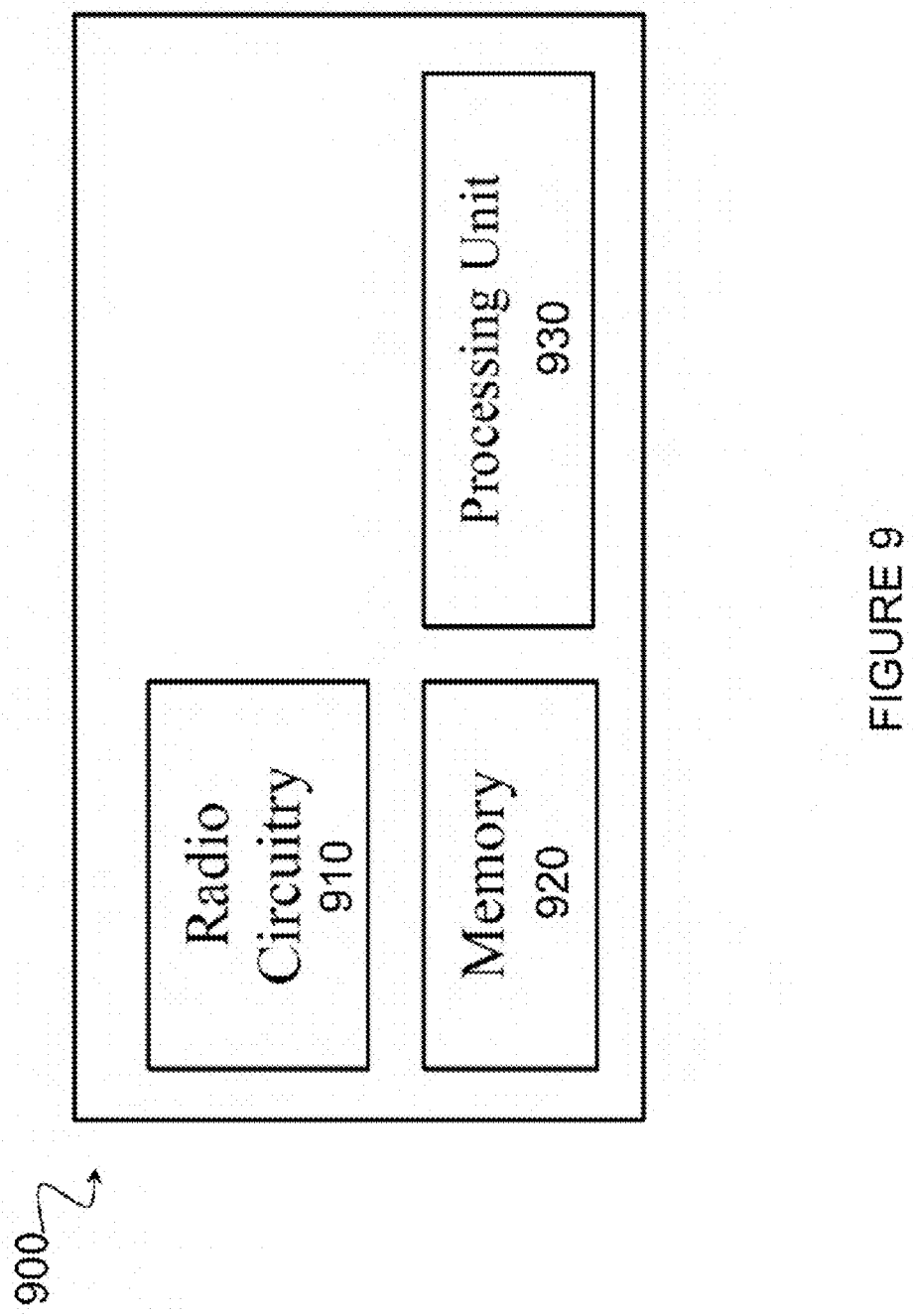
FIG. 9 is a block diagram illustrating example physical units of a wireless device according to one or more embodiments of the present disclosure.

FIG. 9 is a block schematic of an exemplary wireless device 900, in accordance with certain embodiments. The example wireless device of FIG. 9 may be configured to perform the functionality of UEs described above with respect to FIGS. 1-7, or any example of the disclosure. The example wireless device 900 of FIG. 9 may be arranged with radio circuitry 910 to communicate with the serving base station, memory 920 to store information related to the invention, and a processing unit 930. The radio circuitry 910 may be configured to communicate with the serving base station, including receiving from the base station a RAR message to transmit message 3 with OFDM or DFTS-OFDM and responding with message 3 in accordance with the message. In another example the radio circuitry is configured to receive the "modulation format" indicated in a broadcast channel and transmitted in a non UE-specific manner. A variant of this may be to tie the uplink waveform to some quantity used during the downlink cell search and synchronization such as the synchronization sequence (one set of sync sequences or cell IDs means DFTS-OFDM, another set means OFDM). In some aspects the broadcast channel includes the master information block (MIB) or a system information block (SIB) which is read by the UE prior to performing a random-access. In other examples the gNB could also indicate both OFDM and DFTS-OFDM. In this case one in one example the processing unit is configured to select based on e.g. the UE power budget one preamble transmission, in other words select one of the modulation formats.

The processing unit may be configured to formulate the message 3 according to the indicated/selected modulation format. The memory may be configured to store information about the UE and other network components.

Figure 10:
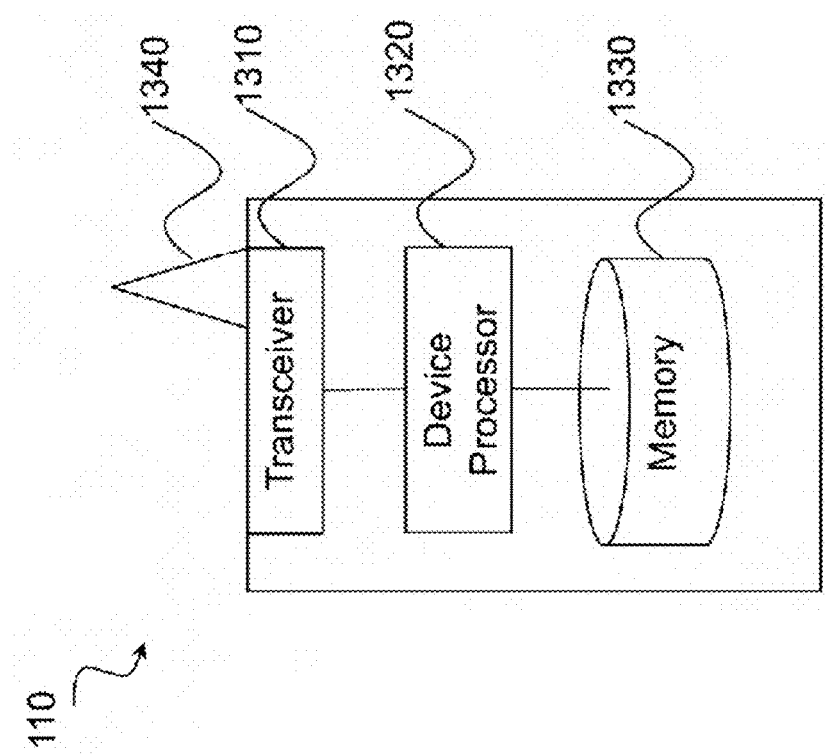
FIG. 10 is a block schematic of an exemplary wireless device, in accordance with certain embodiments.

FIG. 10 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LAME), USB dongles, a D2D capable device, or another device that can provide wireless communication. A wireless device 110 may also be referred to as UE, a station (STA), a device, or a terminal in some embodiments. Wireless device 110 includes transceiver 1310, processor 1320, and memory 1330. In some embodiments, transceiver 1310 facilitates transmitting wireless signals to and receiving wireless signals from network node 115 (e.g., via antenna 1340), processor 1320 executes instructions to provide some or all of the functionality described above as being provided by wireless device 110, and memory 1330 stores the instructions executed by processor 1320.

Processor 1320 may include any suitable combination of hardware and software implemented in one or more modules to execute instructions and manipulate data to perform some or all of the described functions of wireless device 110, such as the functions of wireless device 110 described above in relation to FIGS. 1-9. For example, to communicate with the serving base station, including receiving from the base station a RAR message to transmit message 3 with OFDM or DFTS-OFDM and responding with message 3 in accordance with the message. In another example, to receive the "modulation format" indicated in a broadcast channel and transmitted in a non UE-specific manner. A variant of this may be to tie the uplink waveform to some quantity used during the downlink cell search and synchronization such as the synchronization sequence (one set of sync sequences or cell IDs means DFTS-OFDM, another set means OFDM). In some aspects the broadcast channel includes the master information block (MIB) or a system information block (SIB) which is read by the UE prior to performing a random-access. In other examples the gNB could also indicate both OFDM and DFTS-OFDM. In this case in one example the processor selects—based on e.g. the UE power budget—one preamble transmission, in other words selects one of the modulation formats.

In some embodiments, processor 1320 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 1320. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 11:
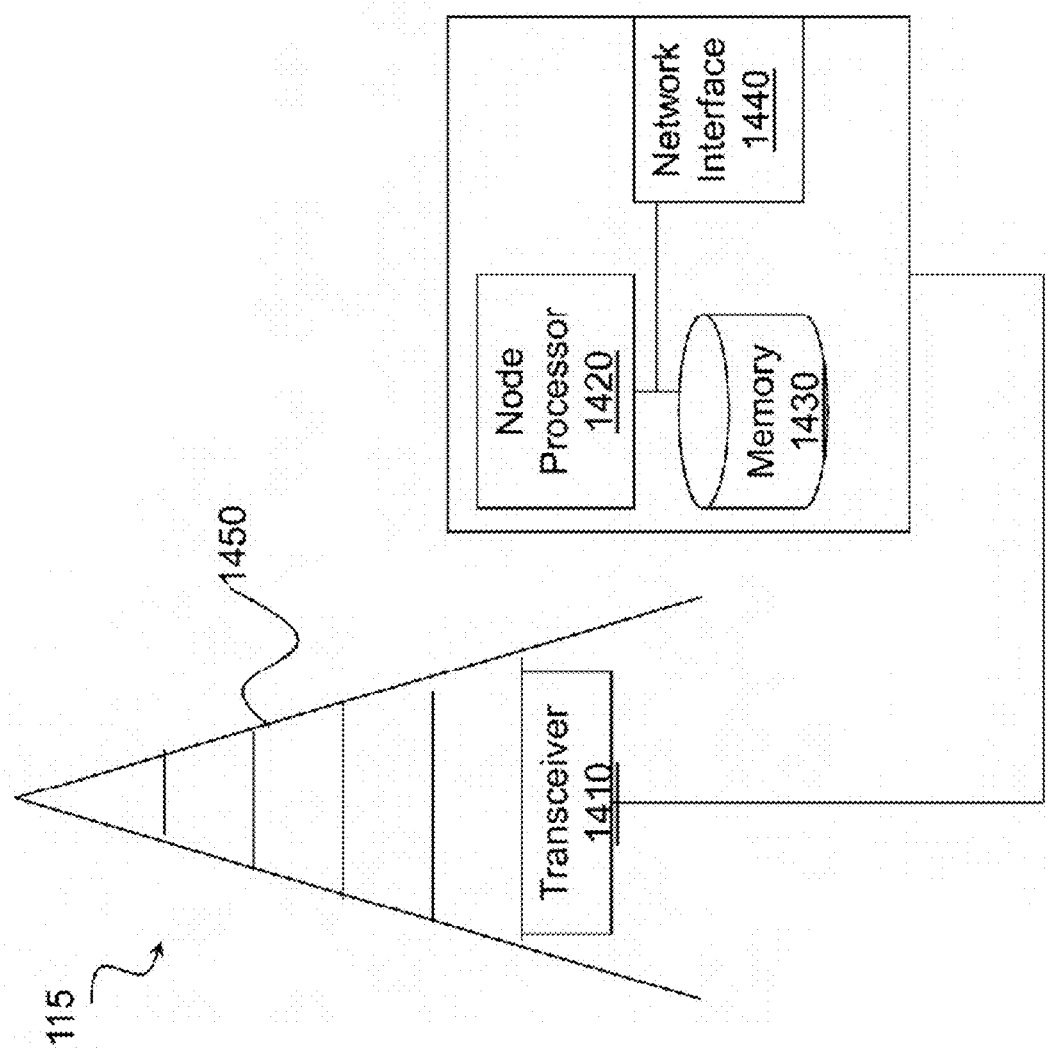
FIG. 11 is a block schematic of an exemplary network node, in accordance with certain embodiments

FIG. 11 is a block schematic of an exemplary network node, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1410, processor 1420, memory 1430, and network interface 1440. In some embodiments, transceiver 1410 facilitates transmitting wireless signals to and receiving wireless signals from wireless device 110 (e.g., via antenna 1450), processor 1420 executes instructions to provide some or all of the functionality described above as being provided by a network node 115, memory 1430 stores the instructions executed by processor 1420, and network interface 1440 communicates signals to backend network components, such as a gateway, switch, router, Internet, Public Switched Telephone Network (PSTN), core network nodes or radio network controllers 130, etc.

Processor 1420 may include any suitable combination of hardware and software implemented in one or more modules to execute instructions and manipulate data to perform some or all of the described functions of network node 115, such as those described above in relation to FIGS. 1-9 above. For example to communicate with served UEs, including communicating a RAR message to the UE to transmit message 3 with OFDM or DFTS-OFDM. In another example to transmit the "modulation format" in a broadcast channel and transmitted in a non UE-specific manner. A variant of this may be to tie the uplink waveform to some quantity used during the downlink cell search and synchronization such as the synchronization sequence. (one set of sync sequences or cell IDs means DFTS-OFDM, another set means OFDM). In some aspects the broadcast channel includes the master information block (MIB) or a system information block (SIB) which is read by the UE prior to performing a random-access.

In some embodiments, processor 1420 may include, for example, one or more computers, one or more central processing units (CPUs), one or more microprocessors, one or more applications, and/or other logic.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1440 is communicatively coupled to processor 1420 and may refer to any suitable device operable to receive input for network node 115, send output from network node 115, perform suitable processing of the input or output or both, communicate to other devices, or any combination of the preceding. Network interface 1440 may include appropriate hardware (e.g., port, modem, network interface card, etc.) and software, including protocol conversion and data processing capabilities, to communicate through a network.

Other embodiments of network node 115 may include additional components beyond those shown in FIG. 11 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 12:
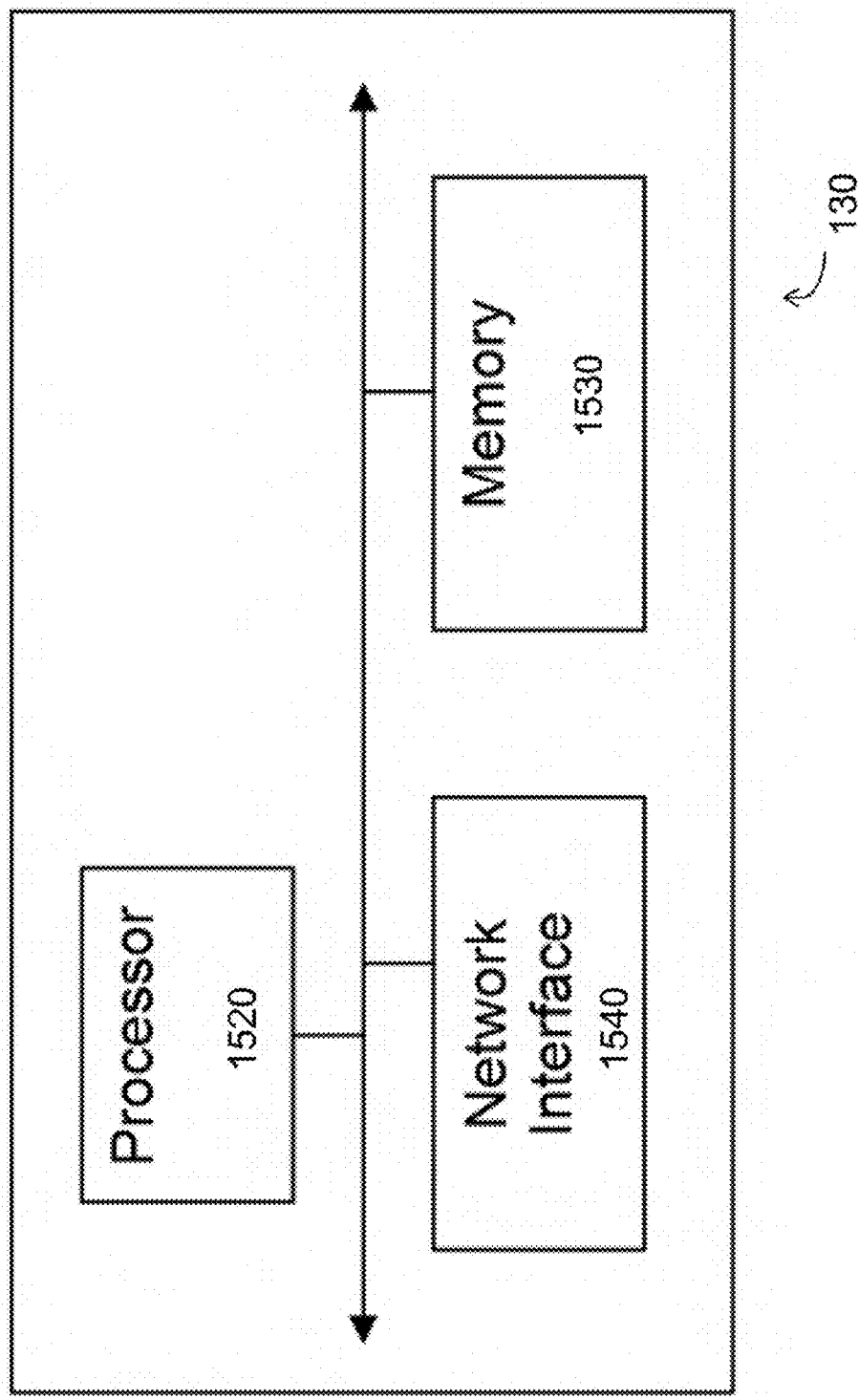
FIG. 12 is a block schematic of an exemplary radio network controller or core network node 130, in accordance with certain embodiments.

FIG. 12 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1520, memory 1530, and network interface 1540. In some embodiments, processor 1520 executes instructions to provide some or all of the functionality described above as being provided by the network node, memory 1530 stores the instructions executed by processor 1520, and network interface 1540 communicates signals to any suitable node, such as a gateway, switch, router, Internet, Public Switched Telephone Network (PSTN), network nodes 115, radio network controllers or core network nodes 130, etc.

Processor 1520 may include any suitable combination of hardware and software implemented in one or more modules to execute instructions and manipulate data to perform some or all of the described functions of the radio network controller or core network node 130. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact. Disk (CD) or a Digital Video Disk (DVD)), and/or or any other volatile or non-volatile, non-transitory computer-readable and/or computer-executable memory devices that store information.

In some embodiments, network interface 1540 is communicatively coupled to processor 1520 and may refer to any suitable device operable to receive input for the network node, send output from the network node, perform suitable processing of the input or output or both, communicate to other devices, or any combination of the preceding. Network interface 1540 may include appropriate hardware (e.g., port, modem, network interface card, etc.) and software, including protocol conversion and data processing capabilities, to communicate through a network.

Other embodiments of the network node may include additional components beyond those shown in FIG. 12 that may be responsible for providing certain aspects of the network node's functionality, including any of the functionality described above and/or any additional functionality (including any functionality necessary to support the solution described above).

Figure 13:
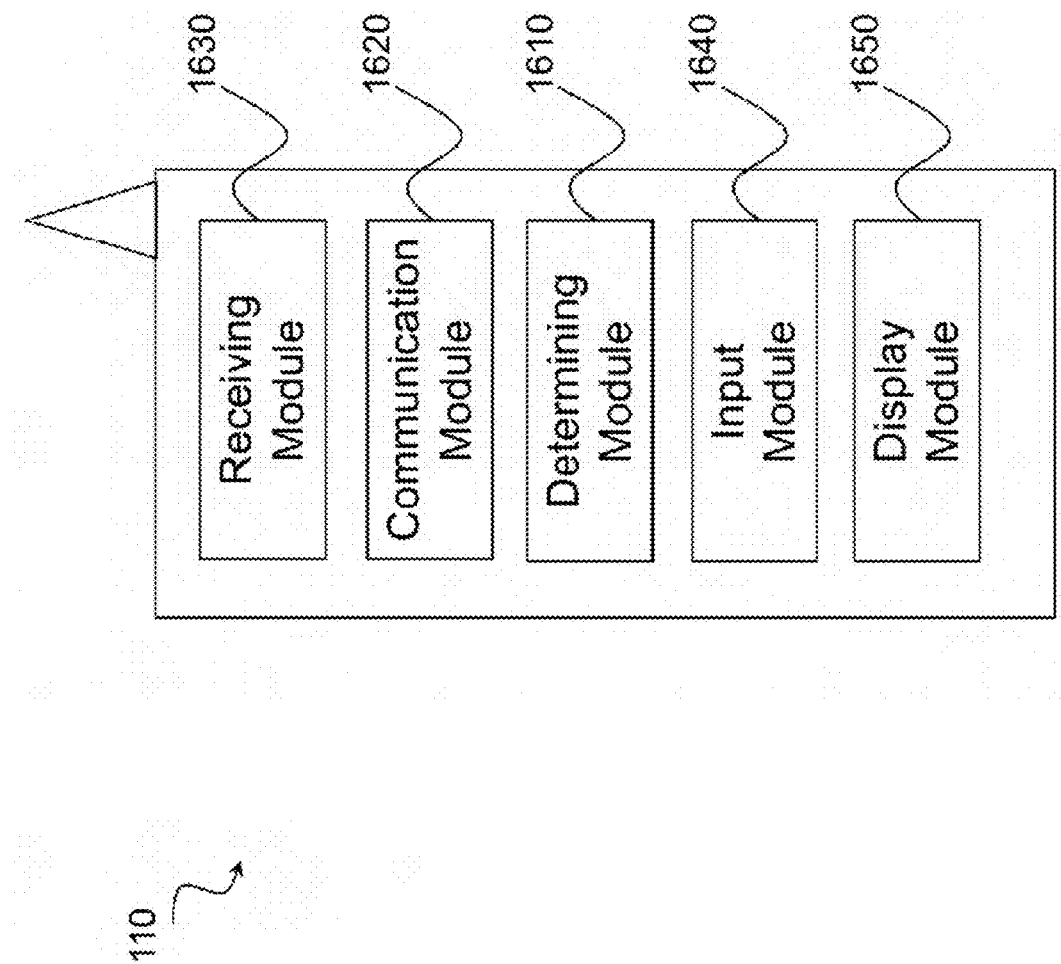
FIG. 13 is a block schematic of an exemplary wireless device, in accordance with certain embodiments.

FIG. 13 is a block schematic of an exemplary wireless device, in accordance with certain embodiments. Wireless device 110 may include one or more modules. For example, wireless device 110 may include a determining module 1610, a communication module 1620, a receiving module 1630, an input module 1640, a display module 1650, and any other suitable modules. In some embodiments, one or more of determining module 1610, communication module 1620, receiving module 1630, input module 1640, display module 1650 or any other suitable module may be implemented using one or more processors, such as processor 1320 described above in relation to FIG. 10. In certain embodiments, the functions of two or more of the various modules may be combined into a single module. Wireless device 110 may perform the RAR functionality described above with respect to FIGS. 1-9.

Determining module 1610 may perform the processing functions of wireless device 110. For example, determining module 1610 may configure a message 3 in response to a RAR message from a base station indicating modulation format. Determining module 1610 may include or be included in one or more processors, such as processor 1320 described above in relation to FIG. 10. Determining module 1610 may include analog and/or digital circuitry configured to perform any of the functions of determining module 1610 and/or processor 1320 described above. The functions of determining module 1610 described above may, in certain embodiments, be performed in one or more distinct modules.

Communication module 1620 may perform the transmission functions of wireless device 110. For example, communication module 1620 send a message 3 in accordance with a RAR message from a base station. Communication module 1620 may include a transmitter and/or a transceiver, such as transceiver 1310 described above in relation to FIG. 10. Communication module 1620 may include circuitry configured to wirelessly transmit messages and/or signals. In particular embodiments, communication module 1620 may receive messages and/or signals for transmission from determining module 1610. In certain embodiments, the functions of communication module 1620 described above may be performed in one or more distinct modules.

Receiving module 1630 may perform the receiving functions of wireless device 110. As one example, receiving module 1630 may receive from the base station a RAR message to transmit message 3 with OFDM or DFTS-OFDM. Receiving module 1630 may include a receiver and/or a transceiver, such as transceiver 1310 described above in relation to FIG. 10. Receiving module 1630 may include circuitry configured to wirelessly receive messages and/or signals. In particular embodiments, receiving module 1630 may communicate received messages and/or signals to determining module 1610. The functions of receiving module 1630 described above may, in certain embodiments, be performed in one or more distinct modules.

Input module 1640 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1610.

Display module 1650 may present signals on a display of wireless device 110. Display module 1650 may include the display and/or any appropriate circuitry and hardware configured to present signals on the display. Display module 1650 may receive signals to present on the display from determining module 1610.

Determining module 1610, communication module 1620, receiving module 1630, input module 1640, and display module 1650 may include any suitable configuration of hardware and/or software. Wireless device 110 may include additional modules beyond those shown in FIG. 13 that may be responsible for providing any suitable functionality, including any of the functionality described above and/or any additional functionality (including any functionality necessary to support the various solutions described herein).

Figure 14:
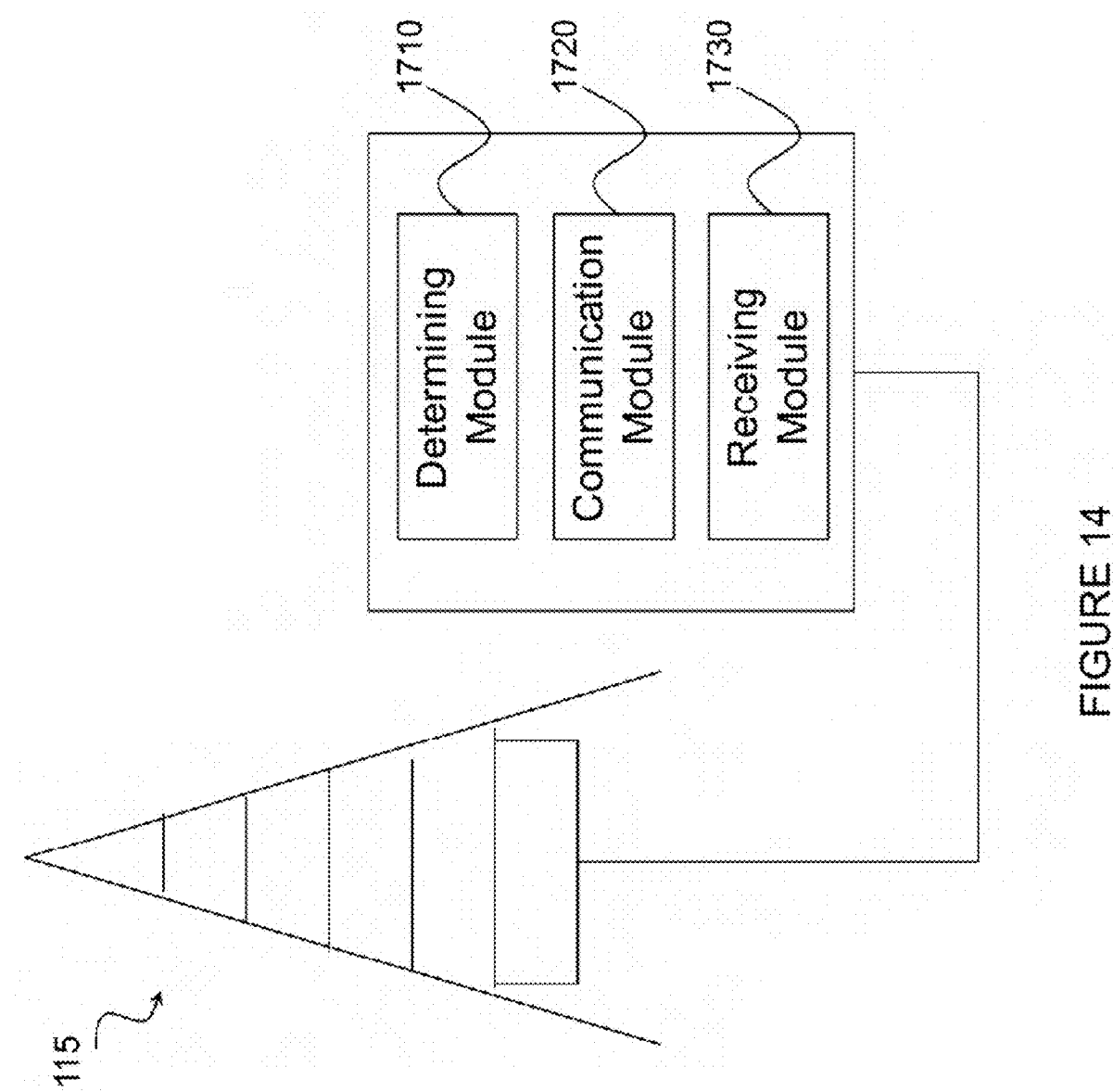
FIG. 14 is a block schematic of an exemplary network node, in accordance with certain embodiments

FIG. 14 is a block schematic of an exemplary network node 115, in accordance with certain embodiments. Network node 115 may include one or more modules. For example, network node 115 may include determining module 1710, communication module 1720, receiving module 1730, and any other suitable modules. In some embodiments, one or more of determining module 1710, communication module 1720, receiving module 1730, or any other suitable module may be implemented using one or more processors, such as processor 1420 described above in relation to FIG. 11. In certain embodiments, the functions of two or more of the various modules may be combined into a single module. Network node 115 may perform the RAR functionality described above with respect to FIGS. 1-9.

Determining module 1710 may perform the processing functions of network node 115. For example, determining module 1710 may formulate the RAR messages described above. Determining module 1710 may include or be included in one or more processors, such as processor 1420 described above in relation to FIG. 11. Determining module 1710 may include analog and/or digital circuitry configured to perform any of the functions of determining module 1710 and/or processor 1420 described above. The functions of determining module 1710 may, in certain embodiments, be performed in one or more distinct modules.

Communication module 1720 may perform the transmission functions of network node 115. As one example, communication module 1720 may send the RAR messages described above to a UE. Communication module 1720 may transmit messages to one or more of wireless devices 110. Communication module 1720 may include a transmitter and/or a transceiver, such as transceiver 1410 described above in relation to FIG. 11. Communication module 1720 may include circuitry configured to wirelessly transmit messages and/or signals. In particular embodiments, communication module 1720 may receive messages and/or signals for transmission from determining module 1710 or any other module. The functions of communication module 1720 may, in certain embodiments, be performed in one or more distinct modules.

Receiving module 1730 may perform the receiving functions of network node 115. Receiving module 1730 may receive any suitable information from a wireless device, such as a RAR message 3. Receiving module 1730 may include a receiver and/or a transceiver, such as transceiver 1410 described above in relation to FIG. 11. Receiving module 1730 may include circuitry configured to wirelessly receive messages and/or signals. In particular embodiments, receiving module 1730 may communicate received messages and/or signals to determining module 1710 or any other suitable module. The functions of receiving module 1730 may, in certain embodiments, be performed in one or more distinct modules.

Determining module 1710, communication module 1720, and receiving module 1730 may include any suitable configuration of hardware and/or software. Network node 115 may include additional modules beyond those shown in FIG. 14 that may be responsible for providing any suitable functionality, including any of the functionality described above and/or any additional functionality (including any functionality necessary to support the various solutions described herein).

Figure 15:
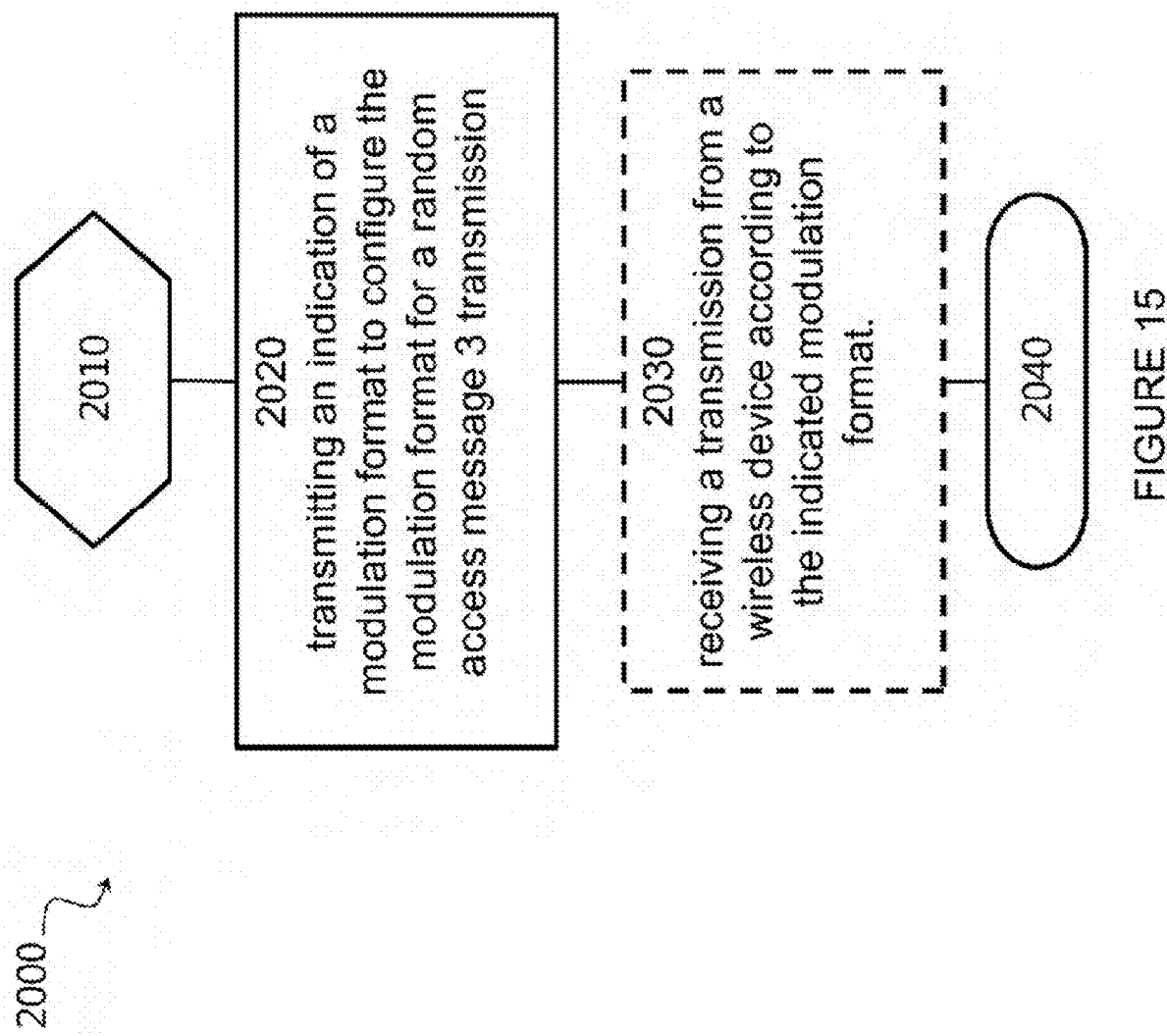
FIG. 15 shows an example method in a base station in accordance with certain embodiments.

FIG. 15 shows an example method 2000 in a base station, wherein the method begins at 2010 with a method in a base station for managing random-access procedures with a plurality of wireless devices. At step 2020 the method includes transmitting an indication of a modulation format to configure the modulation format for a random access message 3 transmission. As disclosed above, such a transmission may be within a RAR message to a wireless device or UE. In other examples, disclosed above, such a transmission is within a broadcast channel and received by a plurality of wireless devices. The method Optionally includes the step 2030 of receiving a transmission from a wireless device according to the indicated modulation format. The method terminates at step 2040.

Figure 16:
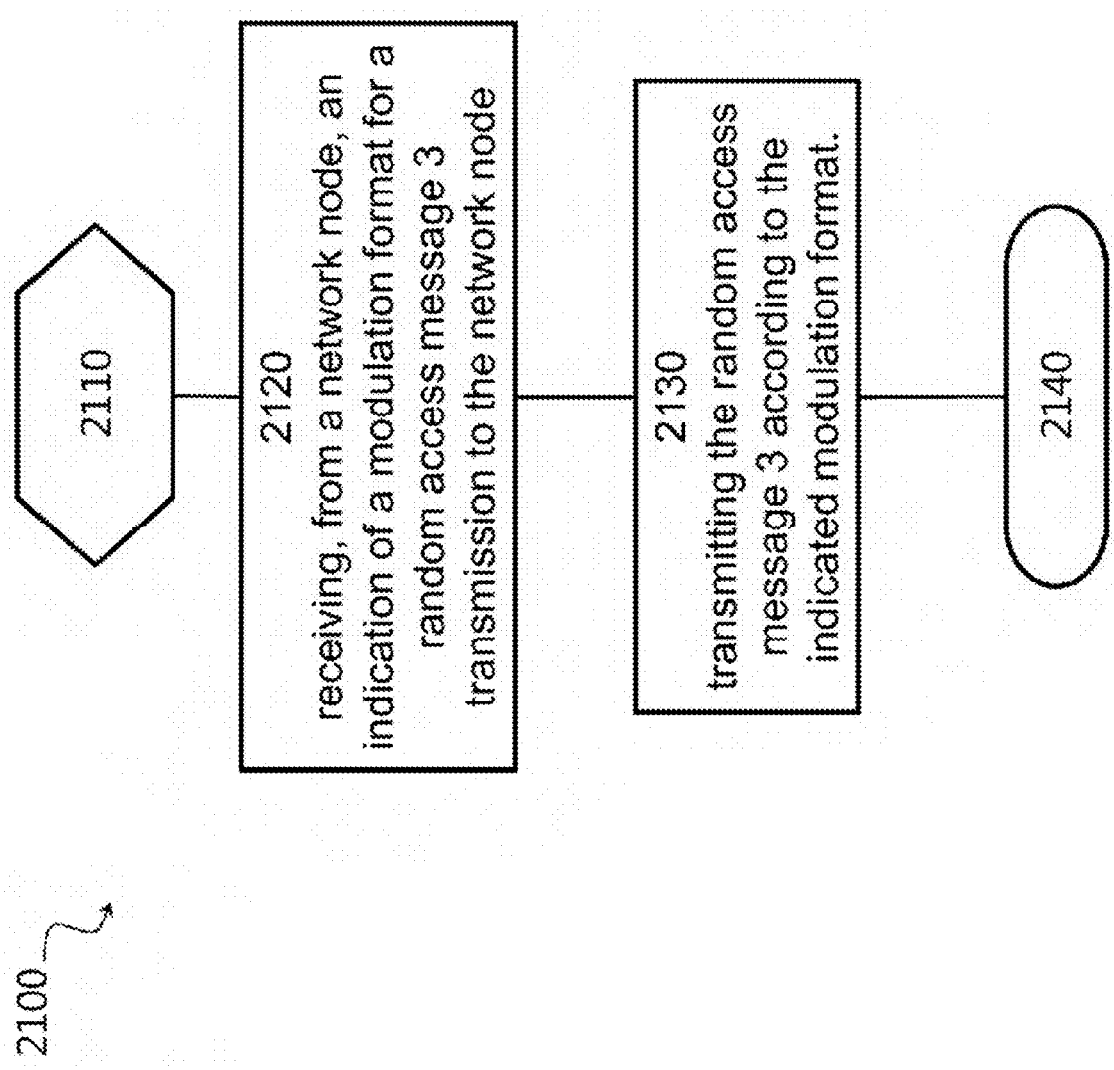
FIG. 16 shows an example method in a wireless device or UE in accordance with certain embodiments.

FIG. 16 shows an example method 2100 in a wireless device or UE, the method begins at step 2110 for performing a random-access procedure with a network node, and proceeds at step 2120 with the wireless device receiving, from a network node, an indication of a modulation format for a random access message 3 transmission to the network node. As disclosed above, the wireless device may receive the indication within a RAR message. In other examples, disclosed above, the wireless device receives the indication within a broadcast channel and received by a plurality of wireless devices. At step 2130 the method continues with the wireless device transmitting the random access message 3 according to the indicated modulation format. The method ends at step 2140. Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3rd Generation Partnership Project
AP Access Point
AMM Active Mode Mobility
BS Base Station
BSC Base Station Controller
BTS Base Transceiver Station
CDM Code Division Multiplexing
CIO Cell Individual Offset
CPE Customer Premises Equipment
CRS Cell Specific Reference Signal
CSI Channel State Information
CSI-RS Channel State Information Reference Signal
D2D Device-to-device
DAS Distributed Antenna System
DCI Downlink Control Information
DFT Discrete Fourier Transform
DL Downlink
DMRS Demodulation Reference Signal
eNB evolved Node B
FDD Frequency Division Duplex
HO Handover
LAN Local Area Network
LEE Laptop Embedded Equipment
LME Laptop Mounted Equipment
LOS Line of Sight
LTE Long Term Evolution
M2M Machine-to-Machine
MAN Metropolitan Area Network
MCE Multi-cell/multicast Coordination Entity
MCS Modulation level and coding scheme
MRS Mobility Reference Signal
MSR Multi-standard Radio
NAS Non-Access Stratum
NR New Radio
OFDM Orthogonal Frequency Division Multiplexing
PDCCH Physical Downlink Control Channel
PDSCH Physical Downlink Shared Channel
PRACH Physical Random-Access Channel
PSTN Public Switched Telephone Network
PUSCH Physical Uplink Shared Channel
PUCCH Physical Uplink Control Channel
RB Resource Block
RBS Radio Base Station
RI Rank Indicator
RNC Radio Network Controller
RRC Radio Resource Control
RRH Remote Radio Head RRU Remote Radio Unit
TDD Time Division Duplex
TFRE Time Frequency Resource Element
TM Transmission Mode
TR Transmission Resource
TTI Transmission-Time Interval
TTT Time to Trigger
UCI Uplink Control Information
UE User Equipment
UL Uplink
WAN Wide Area Network

The invention claimed is:

1. A method by a base station for configuring a modulation format for transmissions from a plurality of User Equipments (UEs) to the base station, the method comprising:
   selecting the modulation format to be either a Discrete Fourier Transform Spread-Orthogonal Frequency Division Multiplexing (DFTS-OFDM) format or an Orthogonal Frequency Division Modulation (OFDM) format, wherein the base station supports both the DFTS-OFDM format and the OFDM format; and
   when DFTS-OFDM is selected, transmitting, within a broadcast channel System Information Block (SIB), an indication to one or more of the plurality of UEs to configure the modulation format for a random access message 3 transmission from the one or more UEs of the plurality of UEs.

2. The method of claim 1, wherein the random access message 3 is the third message in a random access sequence, wherein a first random access message comprises a random access preamble and a second random access message comprises a random access response (RAR).

3. The method of claim 1, wherein the indicated modulation format applies to future data transmissions from the one or more UEs.

4. The method of claim 1, wherein transmitting the indication of a modulation format comprises one of:
   an indication within a broadcast channel;
   an indication within System Information;
   an indication within a Random Access Response, RAR message;
   an implicit indication of a modulation format.

5. The method of claim 1, further comprising:
   receiving a transmission from the one or more UEs according to the indicated modulation format.

6. The method of claim 5, wherein the received transmission is in response to an uplink scheduling grant included in the random access response message.

7. The method of claim 1, wherein the indication of the modulation format further configures a number of transmission layers.

8. A method by a User Equipment (UE), the method comprising:
   receiving, from a base station, an indication to configure a modulation format for a random access message 3 transmission to the base station, wherein the modulation format is Discrete Fourier Transform Spread-Orthogonal Frequency Division Multiplexing (DFTS-OFDM), and wherein the indication is received within a broadcast channel System Information Block (SIB); and
   transmitting, to the base station, the random access message 3 according to the modulation format.

9. The method of claim 8, wherein the random access message 3 is the third message in a random access sequence, wherein a first random access message comprises a random access preamble and a second random access message comprises a random access response, RAR.

10. The method of claim 8, wherein the indication of the modulation format comprises one of:
    an indication within a broadcast channel;
    an indication within System Information, SI;
    an indication within a Random Access Response, RAR, message;
    an indication is an implicit indication of a modulation format.

11. The method of claim 8, wherein the indication of the modulation format configures a number of transmission layers.

12. A base station for configuring a modulation format for transmission from a plurality of User Equipments (UEs) to the base station, wherein the base station comprises:
    processing circuitry configured to:
      select the modulation format to be either a Discrete Fourier Transform Spread-Orthogonal Frequency Division Multiplexing (DFTS-OFDM) format or an Orthogonal Frequency Division Modulation (OFDM) format, wherein the base station supports both the DFTS-OFDM format and the OFDM format; and
      when DFTS-OFDM is selected, transmit, within a broadcast channel System Information Block (SIB), an indication to one or more of the plurality of UEs to configure the modulation format for a random access message 3 transmission from the one or more UEs of the plurality of UEs.

13. A User Equipment (UE) comprising:
    processing circuitry configured to:
      receive, from a base station, an indication to configure a modulation format for a random access message 3 transmission to the base station, wherein the modulation format is Discrete Fourier Transform Spread-Orthogonal Frequency Division Multiplexing (DFTS-OFDM), and wherein the indication is received within a broadcast channel System Information Block (SIB); and
    transmit, to the base station, the random access message 3 according to the indicated modulation format.

14. A base station for configuring a modulation format for transmissions from a plurality of User Equipments (UEs) to the base station, the base station comprising:
    a transceiver in communication with the plurality of UEs;
    a memory storing instructions; and
    processing circuitry configured to execute the instructions to cause the base station to:
      select the modulation format to be either a Discrete Fourier Transform Spread-Orthogonal Frequency Division Multiplexing (DFTS-OFDM) format or an Orthogonal Frequency Division Modulation (OFDM) format, wherein the base station supports both the DFTS-OFDM format and the OFDM format; and
      when DFTS-OFDM is selected, transmit, via the transceiver and within a broadcast channel System Information Block (SIB) to one or more UEs of the plurality of UEs, an indication to configure the modulation format for a random access message 3 transmission from the one or more UEs of the plurality of UEs.

15. A User Equipment (UE) comprising:
    a transceiver in communication with a base station;
    a memory storing instructions; and processing circuitry configured to execute the instructions to cause the UE to:

receive, from the base station via the transceiver, an indication to configure a modulation format for a random access message 3 transmission to the base station, wherein the modulation format is Discrete Fourier Transform Spread-Orthogonal Frequency Division Multiplexing (DFTS-OFDM), and wherein the indication is received within a broadcast channel System Information Block (SIB); and transmit, to the base station, the random access message 3 according to the modulation format.

* * * * *

UNITED STATES PATENT AND TRADEMARK OFFICE
CERTIFICATE OF CORRECTION

PATENT NO. : 11,191,102 B2  
APPLICATION NO. : 15/579494  
DATED : November 30, 2021  
INVENTOR(S) : Sahlin et al.

It is certified that error appears in the above-identified patent and that said Letters Patent is hereby corrected as shown below:

On the Title Page

On Page 2, item (56), under "OTHER PUBLICATIONS", in Column 1, Line 2, delete "complexity" and insert -- low complexity --, therefor.

In the Specification

In Column 1, Line 39, delete "SC-FDMA)" and insert -- a.k.a. SC-FDMA) --, therefor.

In Column 4, Line 32, delete "formal" and insert -- format --, therefor.

In Column 6, Line 28, delete "equipped" and insert -- equipment --, therefor.

In Column 6, Line 30, delete "UL 110" and insert -- UE 110 --, therefor.

In Column 7, Line 3, delete "UR" and insert -- UE --, therefor.

In Column 8, Line 24, delete "LIE" and insert -- UE --, therefor.

In Column 9, Line 19, delete "RAR:" and insert -- RAR --, therefor.

In Column 9, Line 21, delete "radio circuitry 820" and insert -- radio circuitry 810 --, therefor.

In Column 9, Line 58, delete "select based" and insert -- select—based --, therefor.

In Column 9, Line 58, delete "budget one" and insert -- budget—one --, therefor.

In Column 10, Line 8, delete "(LAME)," and insert -- (LME), --, therefor.

In Column 10, Line 62, delete "processor 1020." and insert -- processor 1320. --, therefor.

Signed and Sealed this  
Ninth Day of May, 2023

Katherine Kelly Vidal  
*Director of the United States Patent and Trademark Office*

CERTIFICATE OF CORRECTION (continued)
U.S. Pat. No. 11,191,102 B2

In Column 13, Line 9, delete "Compact. Disk" and insert -- Compact Disk --, therefor.

In Column 15, Line 46, delete "Optionally" and insert -- optionally --, therefor.

In the Claims

In Column 17, Line 20, in Claim 1, delete "Modulation (OFDM)" and insert -- Multiplexing (OFDM) --, therefor.

In Column 18, Lines 22-23, in Claim 12, delete "Modulation (OFDM)" and insert -- Multiplexing (OFDM) --, therefor.

In Column 18, Line 43, in Claim 13, delete "the indicated modulation" and insert -- the modulation --, therefor.

In Column 18, Lines 54-55, in Claim 14, delete "Modulation (OFDM)" and insert -- Multiplexing (OFDM) --, therefor.